(12) United States Patent
Betthauser et al.

(10) Patent No.: US 11,797,580 B2
(45) Date of Patent: Oct. 24, 2023

(54) CONNECTION NATURE BETWEEN NODES IN GRAPH STRUCTURE

(71) Applicant: Microsoft Technology Licensing, LLC, Redmond, WA (US)

(72) Inventors: Leo Moreno Betthauser, Kirkland, WA (US); Maurice Diesendruck, Bellevue, WA (US); Harsh Shrivastava, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/556,622

(22) Filed: Dec. 20, 2021

(65) Prior Publication Data

US 2023/0195758 A1    Jun. 22, 2023

(51) Int. Cl.
*G06F 16/28* (2019.01)
*G06F 16/22* (2019.01)

(52) U.S. Cl.
CPC ........ *G06F 16/288* (2019.01); *G06F 16/2264* (2019.01)

(58) Field of Classification Search
CPC .......................... G06F 16/288; G06F 16/2264
USPC .......................................................... 707/755
See application file for complete search history.

(56) References Cited

U.S. PATENT DOCUMENTS

| | | | | |
|---|---|---|---|---|
| 6,489,968 B1* | 12/2002 | Ortega | ................ | G06F 16/954 715/713 |
| 10,789,526 B2* | 9/2020 | Wilson | ................ | H04L 67/568 |
| 2004/0122803 A1* | 6/2004 | Dom | ................ | G06F 16/9535 |
| 2011/0169833 A1* | 7/2011 | Basak | ................ | G06T 11/20 345/440 |
| 2011/0184945 A1* | 7/2011 | Das | ................ | G01C 21/3453 707/E17.014 |
| 2016/0117602 A1* | 4/2016 | Hassanzadeh | ........ | G06F 16/285 706/11 |
| 2018/0224293 A1* | 8/2018 | Xu | ................ | G01C 21/30 |
| 2019/0287018 A1* | 9/2019 | Coupe | ................ | G06N 20/20 |
| 2021/0390395 A1* | 12/2021 | Ait-Mokhtar | ........ | G06F 40/30 |

OTHER PUBLICATIONS

Krasanakis, et al., "Pygrank: A Python package for graph node ranking", In Repository of arXiv:2110.09274v1, Oct. 18, 2021, 6 Pages.

"International Search Report and Written Opinion Issued in PCT Application No. PCT/US22/052068", dated Mar. 22, 2023, 12 Pages.

* cited by examiner

*Primary Examiner* — Giovanna B Colan
(74) *Attorney, Agent, or Firm* — WORKMAN NYDEGGER (57) ABSTRACT

The interpretation of a graph data structure represented on a computing system in which the connection between a pair of nodes in the graph may be interpreted by which intermediary entity (node or edge) on a path (e.g., a shortest path) between the node pair is most dominant. That is, if the intermediary entity were not present, a detour path is determined. The greater the difference between the detour path and the original path, the more significant that intermediary entity is. The significance of multiple intermediary entities in the original path may be determined in this way.

20 Claims, 6 Drawing Sheets

CONNECTION NATURE BETWEEN NODES IN GRAPH STRUCTURE

BACKGROUND

A "graph" in computer science is an abstract data type that is used to represent relationships between objects. Those objects are represented as nodes (also called vertices), and the relationships are represented as edges (also called arcs). Related nodes are connected via an edge. Nodes and edges can have attributes. An example attribute of an edge is a weight. Graphs may vary in size ranging from perhaps just a few nodes, to millions of nodes. Furthermore, graphs may be sparse having only relatively few edges compared to the number of nodes in the graph, or the graph may be dense, having a larger number of edges. There are a variety of ways to represent graph data structures, and the optimal way to represent a graph data structure will often depend on the size and density of the graph itself.

Graph data structures are used in a wide variety of industries and applications. As an example, a social network can be represented as a graph, where each node represents an account on that social network, and each edge represents a connection (e.g., friend, colleague, employee) between the two accounts. Another example of a graph is a pedigree chart where each node represents a person, and each edge represents a parent-child relationship between the connected nodes. Graphs are also used in a wide variety of industries, such as pharmaceuticals to find connections between drugs. Navigation systems also use graphs where each node represents a location, and each edge represents a neighboring or proximity relationship.

There are ways to find connections between nodes in a graph. For example, there are known mechanisms for finding a shortest path between a pair of nodes in the graph. That shortest path may be in the form of a number of hops between each node in the pair. Alternatively, where edges have weights, the shortest path may be the path that has the lowest cumulative weight going from one node to the next.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In order to get from one node to another node in a graph, a path may be traversed that passes through one or more intermediary nodes and edges (if there is indeed a possible path). Although there are ways to find connections between two nodes in a graph, the nature of the connection is often not fully understood, particularly for non-neighboring nodes in the graph data structure.

The principles described herein relate to the interpretation of a graph data structure represented on a computing system. Specifically, the interpretation allows the connection between a pair of nodes in the graph to be explained by interpreting which intermediary entity or entities (node or edge) on a path (e.g., a shortest path) between the node pair is most dominant. That is, if the intermediary entity were not present, a detour path is determined. The greater the difference between the detour path and the original path, the more significant that intermediary entity is. The significance of multiple intermediary entities in the original path may be determined in this way.

The technical achievement is that the importance of one or more intermediary entities within a path is calculated, which allows for greater insight into the nature of the connection between two nodes in a graph data structure represented on a computing system. As an example, in a graph of pharmaceuticals, the nature of the connection may help to find out not just that one drug could be repurposed to treat another illness, but also what attribute of the drug makes it amenable to potential repurposing. Such understanding is typically beyond human intuition.

Accordingly, the principles described herein allow connections between entities to be understood in complex ways, in ways that exceed human intuition unaided by the principles described herein. Thus, complex data analysis may be performed to allow the computing system to obtain deep understanding of relationships between items represented in a graph data structure. Likewise, all or portions of this deep understanding may be communicated to a user, or to other computing components that may leverage this deep understanding.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

In order to get from one node to another node in a graph, a path may be traversed that passes through one or more intermediary nodes and edges (if there is indeed a possible path). Although there are ways to find connections between two nodes in a graph, the nature of the connection is often not fully understood, particularly for non-neighboring nodes in the graph data structure.

The principles described herein relate to the interpretation of a graph data structure represented on a computing system. Specifically, the interpretation allows the connection between a pair of nodes in the graph to be explained by interpreting which intermediary entity or entities (node or edge) on a path (e.g., a shortest path) between the node pair is most dominant. That is, if the intermediary entity were not present, a detour path is determined. The greater the difference between the detour path and the original path, the more significant that intermediary entity is. The significance of multiple intermediary entities in the original path may be determined in this way.

The technical achievement is that the importance of one or more intermediary entities within a path is calculated, which allows for greater insight into the nature of the connection between two nodes in a graph data structure represented on a computing system. As an example, in a graph of pharmaceuticals, the nature of the connection may help to find out not just that one drug could be repurposed to treat another illness, but also what attribute of the drug makes it amenable to potential repurposing. Such understanding is typically beyond human intuition.

Accordingly, the principles described herein allow connections between entities to be understood in complex ways, in ways that exceed human intuition unaided by the principles described herein. Thus, complex data analysis may be performed to allow the computing system to obtain deep understanding of relationships between items represented in a graph data structure. Likewise, all or portions of this deep understanding may be communicated to a user, or to other computing components that may leverage this deep understanding.

Figure 1:
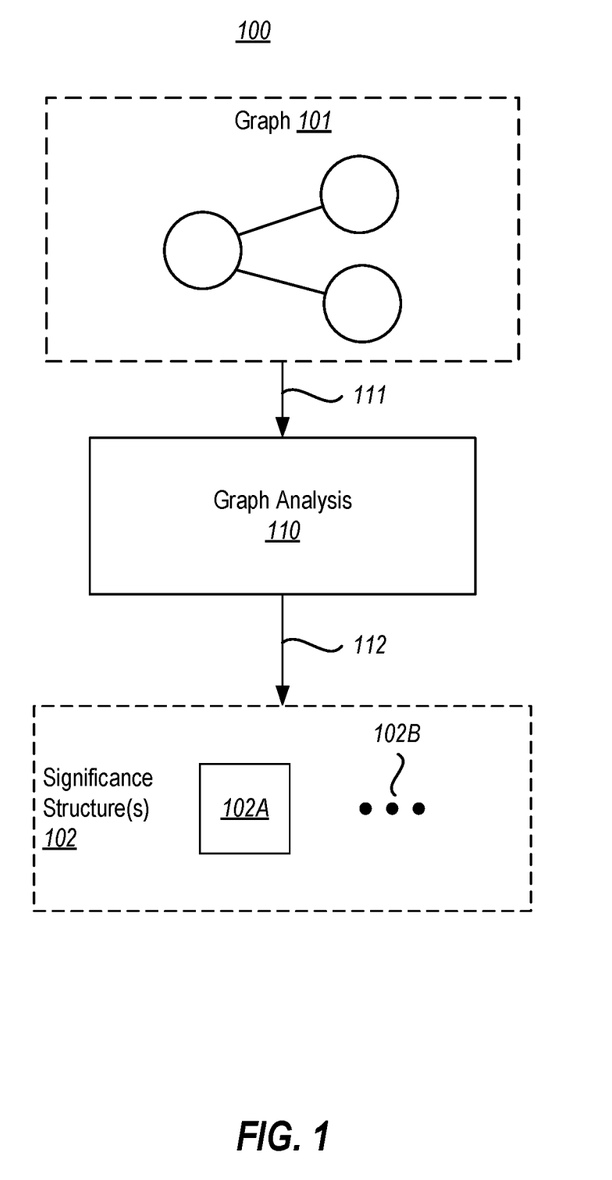
FIG. 1 illustrates a graph analysis environment in which the principles described herein may be employed, and which includes a graph analysis component that evaluates a connection between nodes in a graph data structure and generates resulting significance data structure(s)

FIG. 1 illustrates a graph analysis environment 100 in which the principles described herein may be employed, and which includes a graph analysis component 110. The graph analysis environment 100 may be present on a computing system, such as the computing system 700 described below with respect to FIG. 7. In an example implementation, the graph analysis component 110 is structured as described below for the executable component 706 of FIG. 7.

As illustrated within the environment 100 of FIG. 1, the graph analysis component 110 accesses (as represented by arrow 111) a graph data structure 101 and outputs (as represented by arrow 112) one or more significance data structures 102 each representing a significance of an entity (e.g., a node or edge) of the graph data structure in the connection between a pair of nodes within the graph data structure. Here, the significance data structure(s) 102 are illustrated as including a single significance data structure 102A. However, ellipsis 102B represents that the significance data structure(s) 102 may include any number of significance data structures.

Figure 2:
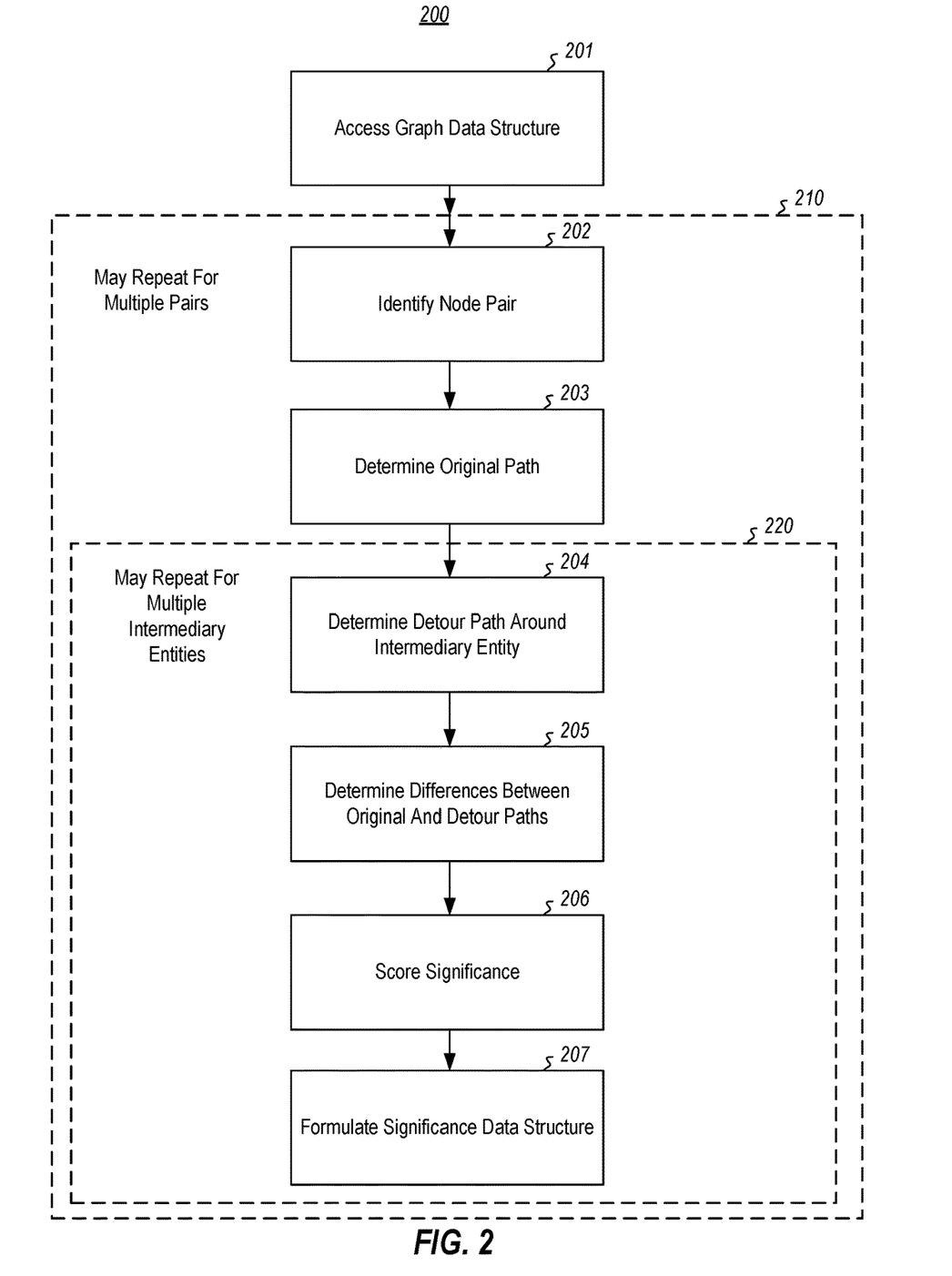
FIG. 2 illustrates a flowchart of a method for determining significance of an intermediary entity of a graph data structure in the connection between two nodes of a graph data structure, in accordance with the principles described herein.

FIG. 2 illustrates a flowchart of a method 200 for determining significance of an intermediary entity of a graph data structure in the connection between two nodes of a graph data structure, in accordance with the principles described herein. The method 200 may be performed by the graph analysis component 110 of FIG. 1 for example, in response to a computing system executing one or more computer-readable executable instructions that are embodied on a computer-readable media and that are structure such that, when executed by one or more processors of the computing system, cause the computing system to instantiate and/or operate the graph analysis component 110. The method 200 of FIG. 2 will be described with frequent reference to the example environment 100 of FIG. 1.

In the method 200, the computing system accesses a graph data structure having a plurality of entities (act 201). Such entities include nodes and edges. In the example environment 100 of FIG. 1, the graph analysis component 110 accesses the graph data structure 101 as represented by arrow 111.

Each node represents an object, person, or group or any other identifiable thing. Each edge defines a relationship between the nodes. In this description and in the claims, the term "relationship" will be used to describe the reason that two nodes are connected by an edge. On the other hand, the term "connection" will be used to describe the nature of the path between a pair of nodes in the graph data structure, where that path could pass through any number of intermediary nodes and edges. Relationships are more intuitive to understand, but connections are far less intuitive, especially for non-neighboring nodes and graphs where there may be different types of relationships defined by the edges. The principles described herein allow for representations of deeper attributes of such connections, allowing for operations on those deeper attributes, and allowing for understanding about the nature of the connection.

Prior to proceeding further within the method 200, an example graph data structure 300 will be described with respect to FIG. 3. In an example referred to herein as the "subject example", it is this graph data structure 300 that will be subjected to computerized analysis. That said, the graph data structure 300 is kept simple and small in order to avoid unnecessarily complicating the example, and so that the principles described herein can be more easily understood. In practice, the graph analysis component may analyze much larger and more complex graph data structures involving hundreds, thousands, or even millions (or more) of nodes and edges. Graph structures are not bounded in size or complexity. The principles described herein can be applied to any size or complexity of graph structure.

Figure 3:
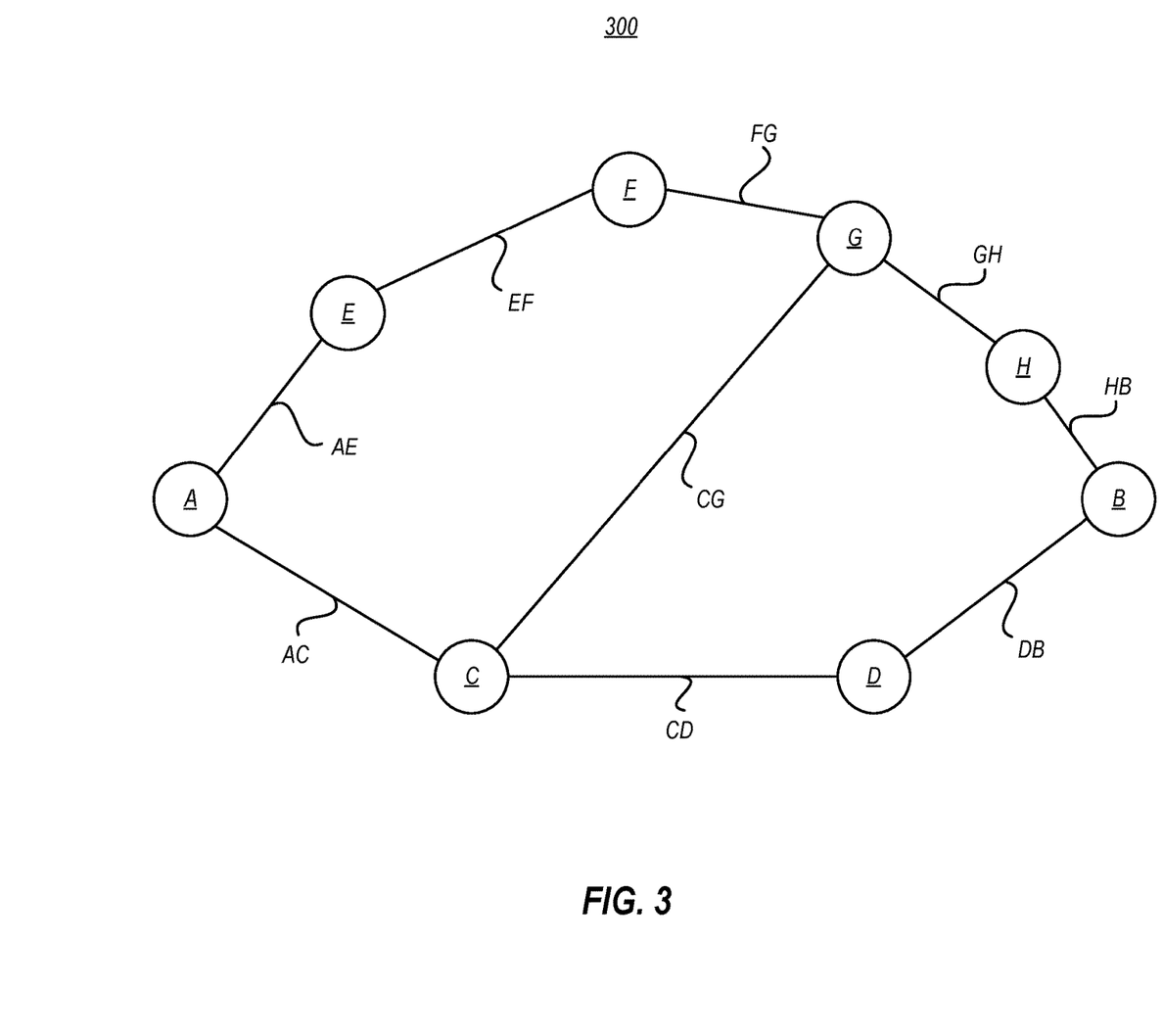
FIG. 3 illustrates an example graph data structure in which there are multiple nodes and multiple edges.

FIG. 3 illustrates the example graph data structure 300 that will be used in the subject example. In the nomenclature of FIG. 3, nodes are labeled with alphabetic characters. The data structure 300 includes eight nodes A through H. Furthermore, in the nomenclature of FIG. 3, edges are labelled with a two character string with each character being used to label one of the nodes in the relationship. By way of example, the edge AC is the edge that connects node A and node C, the edge CD is the node that connects node C and node D, and so forth.

Furthermore, paths will be described in this description by concatenating the labels of the edges (separated by an underscore character) in the path. As an example, there are four acyclic paths from node A to node B, including the shortest path AC_CD_DB (passing through nodes C and D), path AC_CG_GH_HB (passing through nodes C, G and H), path AE_EF_FG_GH_HB (passing through nodes E, F, G and H) and longest path AE_EF_FG_CG_CD_DB (passing through nodes E, F, G, C and D).

This description now returns back to the method 200 of FIG. 2. After the graph analysis component 110 accesses the graph data structure (act 201), the graph analysis component 110 identifies a pair of nodes whose connection is to be evaluated (act 202). As represented by box 210, act 202 and the remainder of the method 200 may be performed for any number of pairs of nodes in the graph data structure. In the subject example, suppose that the node pair to be evaluated in the initial performance of the acts within box 210 is node A and node B of the graph 300 of FIG. 3.

The graph analysis component then identifies a path (which will be called herein an "original path") between the identified pair of nodes (act 203). As an example, suppose that the original path for the node A and node B is AC_CD_DB. Note that in this example, the original path is the shortest path between node A and node B. The original path is a connection between nodes A and B. The principles described herein aim to provide focus on what is the most critical or significant aspect of this connection.

The content of box 220 may then be performed for each of one or more of the intermediary entities in the original path. The content of box 220 is performed in order to formulate a significance data structure representing a significance of the intermediary entity within the original path. Referring to FIG. 1, the graph analysis component 110 outputs the significance data structure 102A.

In order to formulate the significance data structure for a given intermediary entity, the graph analysis component calculates a detour path between the pair of nodes that does not include the particular intermediary entity (act 204). The difference between the original path and the detour path is determined (act 205), and the significance of the intermediary node is then scored based on that difference (act 206). That significance is then represented in the corresponding significance data structure for that given intermediary entity (act 207).

In the subject example with the original path being AC_CD_DB, the intermediary entities include edge AC, node C, edge CD, node D and edge DB because those are the entities in that original path. Now suppose that when the detour path is calculated, the graph analysis component calculates the shortest detour path. Furthermore, suppose that the difference between the original path and the detour path is measured based on a number of edges (e.g., a number of hops) between the original path and the detour path. A paragraph will now be devoted to an example performance of the content of box 220 for each of these intermediary entities.

If the intermediary entity was edge AC, the shortest detour path is path AE_EF_FG_GH_HB, which is five edges. The difference between the shortest detour path (if edge AC is removed) between node A and node B, and the shortest path between node A and node B is thus two hops. Suppose that a difference of two hops results in the intermediary entity being scored as very significant. In that case, edge AC would be scored as very significant.

If the intermediary entity was node C, the shortest detour path is again path AE_EF_FG_GH_HB, which is five edges. The difference between the shortest detour path (if node C is removed) between node A and node B, and the shortest path between node A and node B is thus two hops. In that case, node C also would be scored as very significant.

If the intermediary entity was edge CD, the shortest detour path is path AC_CG_GH_HB, which is four edges. The difference between the shortest detour path (if edge CD is removed) between node A and node B, and the shortest path between node A and node B is thus one hop. Suppose that a difference of one hop results in the intermediary entity being scored as somewhat significant. In that case, edge CD would be scored as somewhat significant.

If the intermediary entity was node D, the shortest detour path is again path AC_CG_GH_HB, which is four edges. The difference between the shortest detour path (if node D is removed) between node A and node B, and the shortest path between node A and node B is thus one hop. In that case, node D also would be scored as somewhat significant.

Finally, if the intermediary entity was edge DB, the shortest detour path is again path AC_CG_GH_HB, which is four edges. The difference between the shortest detour path (if edge DB is removed) between node A and node B, and the shortest path between node A and node B is thus one hop. In that case, edge CD would be scored as somewhat significant.

Thus, in this example, edge AC and node C would be scored as very significant. Edge CD, node D, and edge DB would be scored as somewhat significant. That said, the principles described herein are not limited to performing the significant determination for all of the intermediary nodes. However, if the scoring is performed for more intermediary entities, the connection between the pair of nodes A and B may be more refined than if the significance of but a single intermediary entity is determined.

Accordingly, the principles described herein provide for computerized determination of significance of an intermediary entity between pairs of nodes in a graph data structure. This is accomplished by accessing a graph data structure having a plurality of entities including a plurality of nodes and a plurality of edges, identifying a pair of nodes of the plurality of nodes, calculating an original path between the pair of nodes, and formulating a significance data structure representing significance of a particular intermediary entity in the original path. This significance data structure is formulated for that particular intermediary node by calculating a detour path between the pair of nodes that does not include the particular intermediary entity, determining a difference between the original path and the detour path, and scoring a significance of the particular intermediary entity based on the determined difference between the original path and the detour path. This allows the computing system to represent an attribute of the particular intermediary node, the attribute representing information about the nature of the connection between a pair of nodes in the graph data structure. This nature may be well beyond what a human being could infer from a manual analysis of the graph.

In one aspect described herein, this intermediary entity is an intermediary node in the original path. This allows the significance of the object, item, person, or group represented by that node to the larger connection between the pair of nodes to be represented by a computing system, and thus later used in computer analysis of the connection.

Alternatively, this intermediary entity is an intermediary edge in the original path. This allows the significance of the constituent relationship represented by the edge to the overall connection to be represented in the computing system, and thus later used in computer analysis of the connection.

As described above, a significance data structure may be generated for each of multiple intermediary entities within the original path, without limitation to whether the intermediary entities are nodes or edges. Doing this for multiple intermediary entities allows for a more comprehensive view on the significance of a variety of intermediary entities to be represented in the computing system. Furthermore, this makes it more likely that the most significant intermediary entities to the connection may actually be found. This would lead to more accurate representation of the nature of the connection between a pair of nodes in the graph data structure.

In accordance with the principles described herein, the computerized determination of significance of an intermediary entity in the original path is performed by determining a difference between the original path and a detour path detouring around the intermediary entity. In one aspect, the original path is a shortest path between the pair of nodes. In this case, the measuring of a difference between the detour path and the original path represents how many more hops the detour path takes as compared to the original path. This permits a highly accurate mechanism for testing how important the intermediary entity is in the connection. The longer the detour, the more significant that intermediary entity is. The detour path may likewise be a shortest path that goes between the pair of nodes but yet does not use the intermediary node. Note that there may be multiple shortest paths between a pair of nodes. In this case, perhaps the significance of each intermediary entity in each of the shortest paths is determined.

On the other hand, multiple detour paths may be used to figure out how much difference there is in traveling around the intermediary entity. For example, a global shortest detour path may be determined that figures out the shortest path between the pair of nodes that routes without using the intermediary node. In addition, a shortest local detour path may be determined that routes from one of the nodes (e.g., a first node) along the original path up to the intermediary entity, but then routes around the intermediary entity to use the shortest path from the node just prior to the intermediary entity to the other node (e.g., the second node). The actual difference is then determined by comparing the shortest path with a weighted combination of detour path scores (where a score can be number of hops or a weighted path length). As an example, if the original path has 3 hops, the global detour path has 5 hops, and the local detour path has 6 hops, and the global/local weighting is 50/50, the detour hops would be determined to be the average of 5.5 hops for the detour paths. The difference with the original path would thus be 2.5 hops. The use of the global and local detour paths allows for different aspects of the significance of the intermediary node to be understood or represented by the computing system.

If the intermediary entities in an original path had associated weights, then these weights may be considered when identifying the original path and the detour path. That is, the original path may be the path between the nodes that results in the least sum of weights. The difference between the detour path(s) and the original path could then be based on the difference between the sum of weights of the detour path(s) and the sum of weights of the original path. Thus, significance of intermediary entities may be calculated in weighted graph data structures.

The principles described herein are not limited to the way that the significance is used. However, in one embodiment, the significance is visually emphasized to a user of the computing system. This allows a user to contribute their own intelligence to understanding and leveraging deeper understanding of the connection between items, groups, people, or objects represented by the nodes in the node pair.

As an example, recall that in the discussion of FIG. 3, the evaluation of the graph data structure 300 resulted in a determination that the edge AC and the node C were very significant in the connection between the node A and the node B. Furthermore, in this example, the edge CD, the node D and the edge DB were determined by the computing system to be somewhat significant in the connection between node A and node B. Accordingly, if size (for nodes) and thickness (for edges) were roughly used to represent this significance, the data structure 300 may be visualized as shown by the visualization 400 of FIG. 4.

Figure 4:
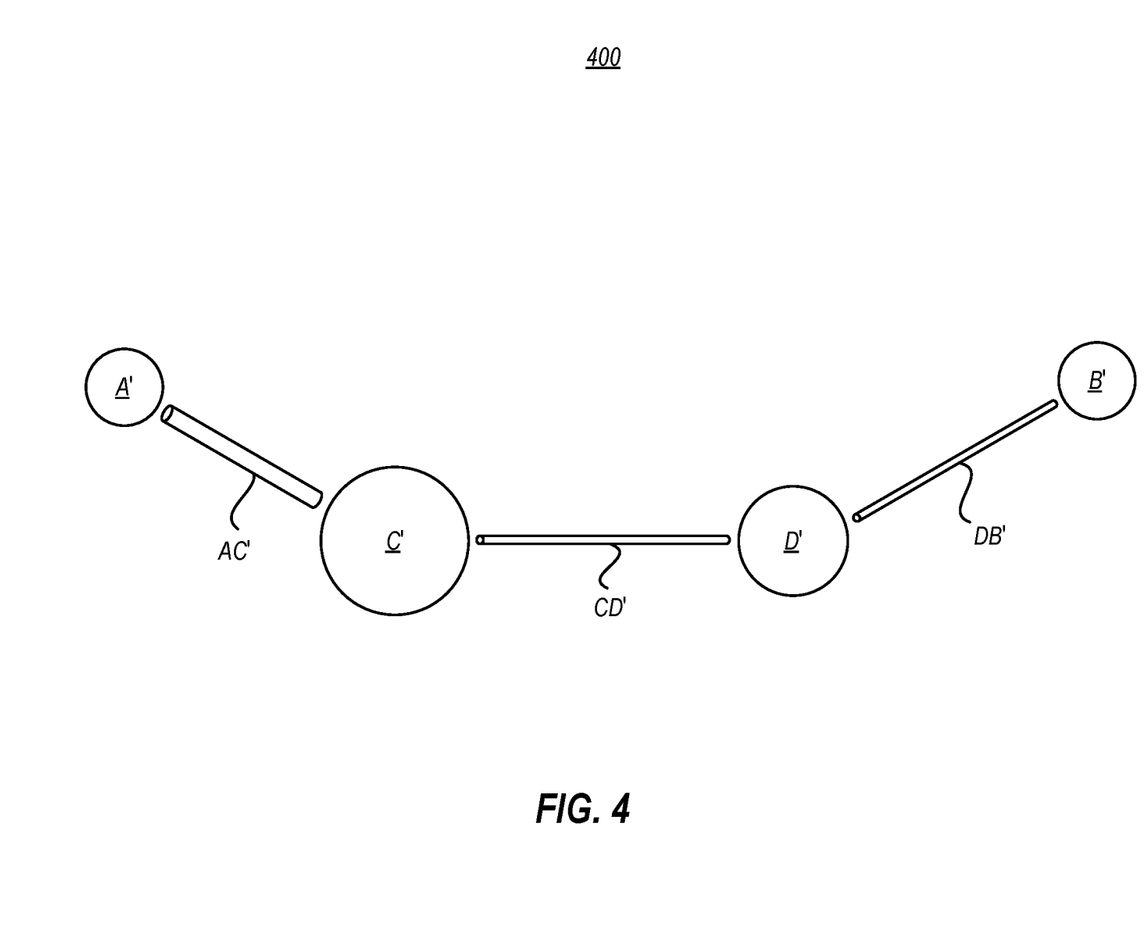
FIG. 4 illustrates a visualization of an original path between two nodes with edges and nodes visually emphasized in accordance with the importance of the intermediary entity in the connection between the two nodes.

Here in FIG. 4, only the original path is visualized though certainly more of the data graph structure may be visualized to give the user further context. The visualization A' of node A and the visualization B' of node B are presented. They may be colorized or otherwise shown in a way that communicates to the user that these are the node pair whose connection is being evaluated. The visualization AC' of the edge AC is shown as thick representing this edge's high significance. Furthermore, the visualization C' of node C is very large representing this node's high significance. The visualization CD' of edge CD and the visualization DB' of edge DB are shown moderately thick to represent these edge's moderate significance. The visualization D' of node D is shown moderately large to represent this node's moderate significance. Thus, the user can quickly see what aspects of the connection between the node pair were most important.

Several application examples will now be described. While the principles described herein may be used in a limitless variety of application, two examples will now be provided to show how the principles described herein may be applied in real life. In one example, the nature of the connection is used in recommender systems. In another example, the nature of the connection is used in a social network.

In the recommender system, each node in the pair of nodes may represent any item. One of the items is an item that the user has previously interacted with. This item may be called herein a "predicate". As an example, the predicate may be a movie that a user has previously watched, a product that the user has previously purchased or added to an electronic shopping cart, a comment that the user had previously made, a drug that has been previously approved for use, a use for which a given product has been previously approved, and so forth. The other node in the pair of nodes may be an item that the user might prospectively interact with. The computing system may use the deeper understanding of the nature of the connection between the predicate item and the prospective item to determine whether to recommend the prospective item, and if recommended, why in detail the recommendation is being made.

In the social media example, the nodes may represent accounts in a social media network. The principles described herein may provide a deep understanding for relationships between two entities. As an example, the computing system might understand that a person's most successful friend recommendations could be explained by mutual membership in groups related to books and reading. The computing system may thus formulate complex explanations for how different accounts are related within a social media network.

Figure 5:
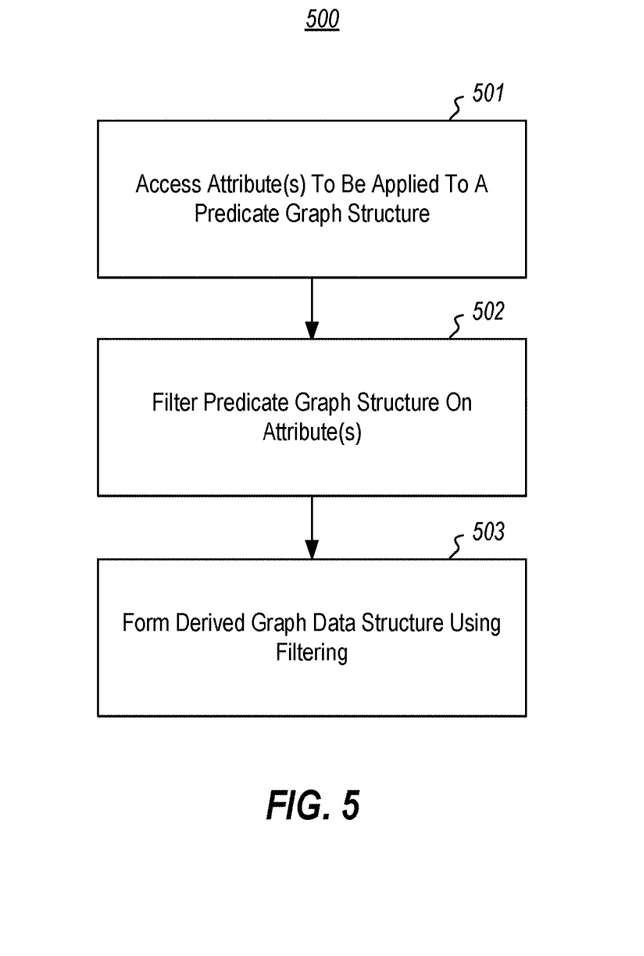
FIG. 5 illustrates a flowchart of a method for accessing the data structure, by formulating a derived graph data structure.

As previously mentioned, the method 200 of FIG. 2 begins by accessing a graph data structure (act 201). This graph data structure may be a derived graph structure based on a predicate graph data structure. FIG. 5 illustrates a flowchart of a method 500 for accessing the derived data structure, by formulating a derived graph data structure. This method 500 is one example of how act 201 may be performed. The method 500 includes determining attributes to be applied to a predicate graph data structure (act 501).

Then, the predicate graph data structure is filtered (act 502) to formulate the derived graph data structure (act 503).

Figure 6:
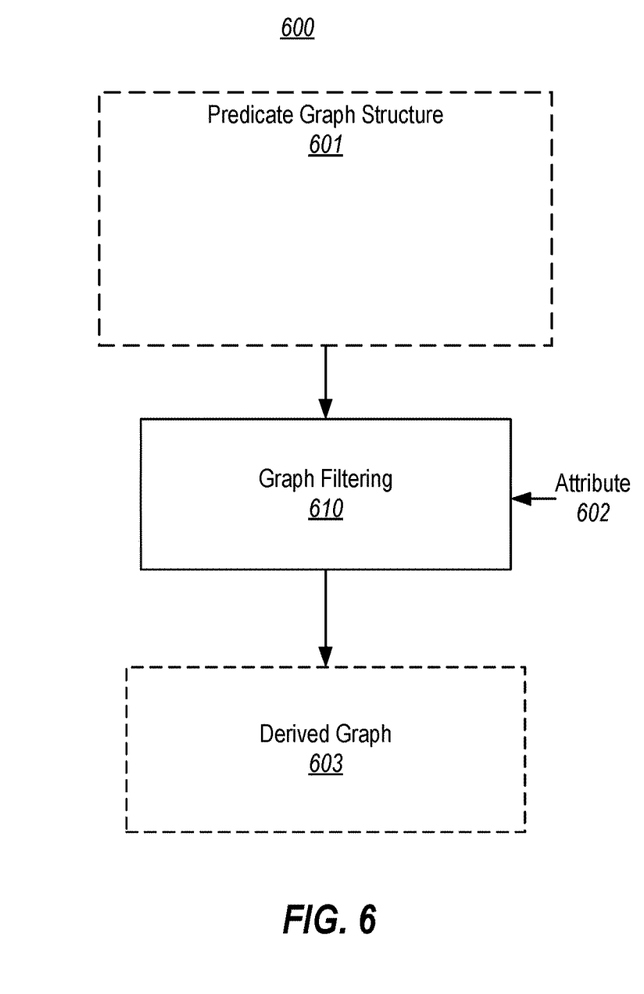
FIG. 6 illustrates a graph filtering component that uses the predicate graph data structure and input attributes to generate a version of a derived graph structure.

For instance, FIG. 6 illustrates an environment 600 that includes a graph filtering component 610 that uses the predicate graph data structure 601 and input attributes 602 to generate a version of a derived graph data structure 603. The attributes 602 could include node attribute(s) and/or edge attribute(s). In that case, the derived graph data structure 603 is a version of the predicate graph data structure 601 in which the nodes that include the specified node attribute(s) are removed, and in which the edges that include the specified edge attribute(s) are removed. Alternatively, the derived graph data structure 603 is a version of the predicate graph data structure 601 in which only the nodes that include the specified node attribute(s) are included, and in which only the edges that include the specified edge attribute(s) are included. This simplifies the graph data structure that is being evaluated, thereby saving processing resources, and making faster the formulation of the deeper understanding of the connection between node pairs. Furthermore, processing is focused on the nodes and edges of interest, thereby avoiding unnecessary usage of computing resources.

As previously described with respect to FIG. 2, the deeper nature of connections between node pairs may be determined for multiple node pairs by performing the content of box 210 multiple times, once for each node pair. In one example, the connections between one node and each of several other nodes are evaluated. In this case, a focus node is a common node that is present in each of the node pairs. This allows the connections between a single item represented by a focus node to be evaluated for several surrounding nodes. In FIG. 2, for example, the method 200 was described as being performed to evaluate the connection between node A and node B. However, the content of box 210 may also be used to formulate a deep understanding of the important intermediary nodes in the connection between node A and node G, and so forth.

In a recommender system, the focus node may be a predicate item, and each of the other nodes could be potential recommendations. The deeper understanding of each of the connections allows the computing system to use the deeper understanding of the connections to formulate relevant and helpful recommendations.

Alternatively, or in addition, within a given region of the graph data structure, connections between node pairs may be evaluated using the method 200 without regard to each connection sharing a common node. Thus, in FIG. 2, perhaps the connection between node A and B, the connection between node G and D, the connection between node F and C, and the connection between node B and E are each evaluated. This permits the computer to gain characteristics of a region of the graph data structure.

Because the principles described herein are performed in the context of a computing system, some introductory discussion of a computing system will be described with respect to FIG. 7. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
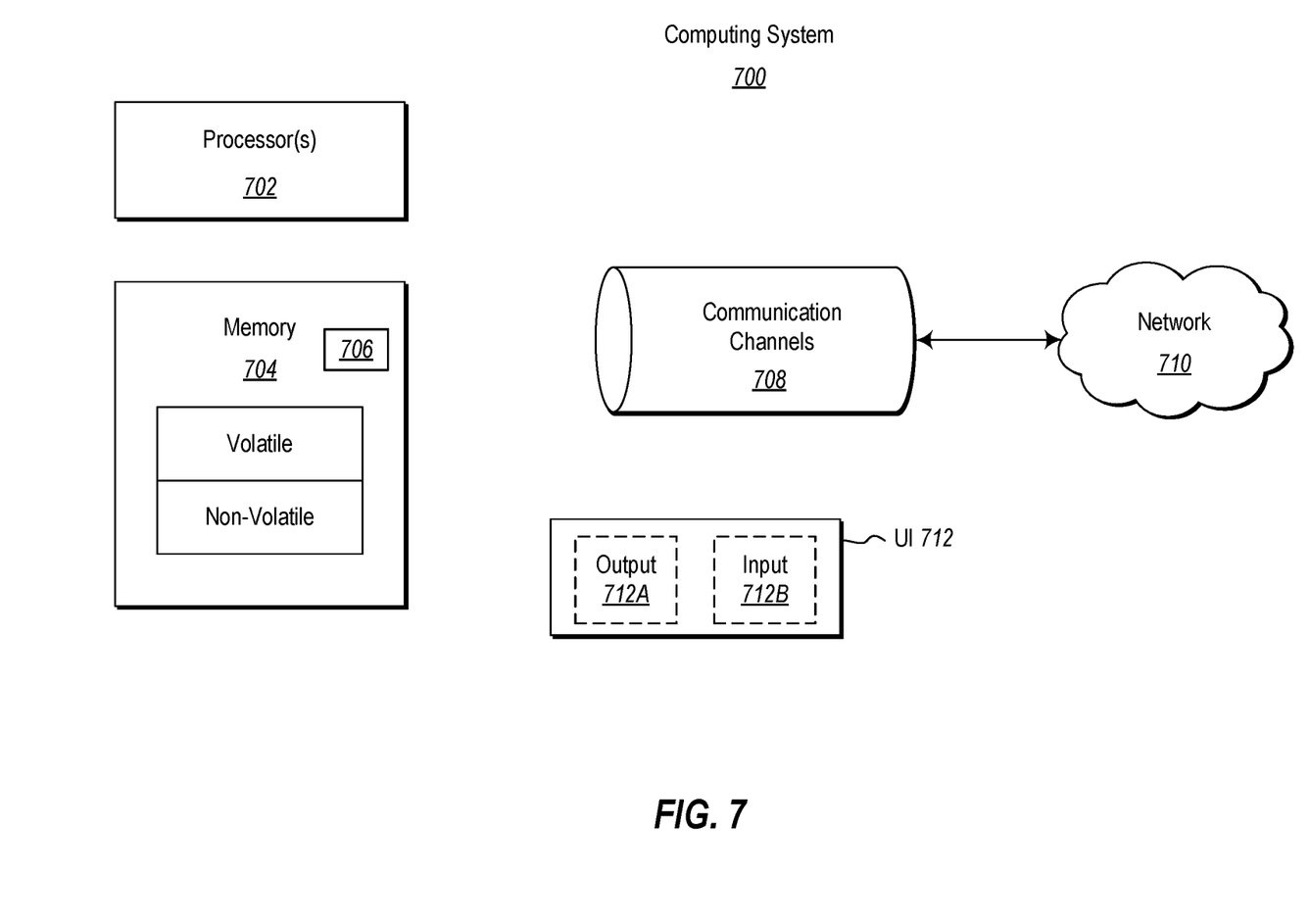
FIG. 7 illustrates an example computing system in which the principles described herein may be employed.

As illustrated in FIG. 7, in its most basic configuration, a computing system 700 includes at least one hardware processing unit 702 and memory 704. The processing unit 702 includes a general-purpose processor. Although not required, the processing unit 702 may also include a field programmable gate array (FPGA), an application specific integrated circuit (ASIC), or any other specialized circuit. In one embodiment, the memory 704 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 700 also has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, virtual or augmented reality, holograms and so forth. Examples of input mechanisms 712B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
   one or more processors; and
   one or more computer-readable media having thereon instructions that are executable by the one or more processors to cause the computing system to:
   access a graph data structure having a plurality of entities, including a plurality of nodes and a plurality of edges;
   identify a pair of nodes of the plurality of nodes;
   calculate an original path between the pair of nodes, the original path including a plurality of intermediary entities, including one or more intermediary nodes and one or more intermediary edges;
   formulate a significance of a particular intermediary entity of the plurality of intermediary entities in the original path by:
      calculating a global detour path between the pair of nodes, wherein the global detour path does not include the particular intermediary entity;
      calculating a local detour path between the pair of nodes, wherein the local detour path also does not include the particular intermediary entity;
      determining a first score for the global detour path and a second score for the local detour path;
      computing a weighted score by weighting a combination of the first score with the second score;
      determining a difference between a score for the original path and the weighted score; and
      scoring a significance of the particular intermediary entity based on the determined difference between the score for the original path and the weighted score.

2. The computing system in accordance with claim 1, wherein execution of the instructions further causes the computing system to visually emphasize the particular intermediate entity based on the scored significance.

3. The computing system in accordance with claim 1, one node of the pair of nodes being a recommendation, and the other of the pair of nodes being a predicate for the recommendation, wherein execution of the instructions further causes the computing system to formulate an explanation for the recommendation using the significance score of the particular intermediary entity.

4. The computing system in accordance with claim 1, wherein execution of the instructions further causes the computing system to perform the configured formulation for multiple of the plurality of intermediary entities.

5. The computing system in accordance with claim 1, the original path being a shortest path between the pair of nodes, the global detour path being a shortest path that excludes the particular entity between the pair of nodes.

6. The computing system in accordance with claim 1, the original path being a lowest edge weight path between the pair of nodes, the global detour path being a lowest edge weight path that excludes the particular entity between the pair of nodes.

7. A computer-implemented method to for interpreting a graph data structure represented on a computing system, the method comprising:
   accessing, by a computing system, a graph data structure having a plurality of entities, including a plurality of nodes and a plurality of edges;
   identifying, by the computing system, a pair of nodes of the plurality of nodes;
   calculating, by the computing system, an original path between the pair of nodes, the original path including a plurality of intermediary entities, including one or more intermediary nodes and one or more intermediary edges;
   formulating, by the computing system, a significance data structure of a particular intermediary entity of the plurality of intermediary entities in the original path by:
      calculating a global detour path between the pair of nodes, wherein the global detour path does not include the particular intermediary entity;
      calculating a local detour path between the pair of nodes, wherein the local detour path also does not include the particular intermediary entity;
      determining a first score for the global detour path and a second score for the local detour path;
      computing a weighted score by weighting a combination of the first score with the second score;
      determining a difference between a score for the original path and the weighted score; and
      scoring a significance of the particular intermediary entity based on the determined difference between the score for the original path and the weighted score.

8. The method in accordance with claim 7, the particular entity being an intermediary node in the original path.

9. The method in accordance with claim 8, the particular entity being an intermediary edge in the original path.

10. The method in accordance with claim 7, one node of the pair of nodes being a recommendation, and the other of the pair of nodes being a predicate for the recommendation, the method further comprising:
    formulating an explanation for the recommendation using the significance score of the particular intermediary entity.

11. The method in accordance with claim 10, the plurality of nodes representing products, the predicate being a previously purchased product, and the recommendation being for a recommended product.

12. The method in accordance with claim 7, further comprising:
    formulating an explanation for a connection between the pair of nodes using the significance score of the particular intermediary entity.

13. The method in accordance with claim 7, the graph of nodes representing a social network with the plurality of nodes each representing accounts in the social network, and with the plurality of edges representing relationships between the accounts in the social network.

14. The method in accordance with claim 7, the original path being a shortest path between the pair of nodes, the global detour path being a shortest path that excludes the particular entity between the pair of nodes.

15. The method in accordance with claim 7, the original path being a lowest edge weight path between the pair of nodes, the global detour path being a lowest edge weight path that excludes the particular entity between the pair of nodes.

16. The method in accordance with claim 7, the graph data structure being a derived graph structure based on a predicate graph data structure, the accessing of the derived data structure comprising:
 determining attributes to be applied to a predicate graph data structure; and
 filtering the predicate graph data structure by the attributes to formulate the derived graph data structure.

17. The method in accordance with claim 7, the method being performed for each of a plurality of pairs of nodes in the accessed graph data structure.

18. The method in accordance with claim 14, the plurality of pairs of nodes each sharing a common node.

19. The method in accordance with claim 14, the plurality of pairs of nodes each being within a defined region of the graph data structure.

20. One or more hardware storage devices that store having instructions that are executable by one or more processors of a computing system to cause the computing system to:
 access a graph data structure having a plurality of entities, including a plurality of nodes and a plurality of edges;
 identify a pair of nodes of the plurality of nodes;
 calculate an original path between the pair of nodes, the original path including a plurality of intermediary entities, including one or more intermediary nodes and one or more intermediary edges;
 formulate a significance of a particular intermediary entity of the plurality of intermediary entities in the original path by:
  calculating a global detour path between the pair of nodes, wherein the global detour path does not include the particular intermediary entity;
  calculating a local detour path between the pair of nodes, wherein the local detour path also does not include the particular intermediary entity;
  determining a first score for the global detour path and a second score for the local detour path;
  computing a weighted score by weighting a combination of the first score with the second score;
  determining a difference between a score for the original path and the weighted score; and
  scoring a significance of the particular intermediary entity based on the determined difference between the score for the original path and the weighted score.

* * * * *